United States Patent Office 3,111,503
Patented Nov. 19, 1963

3,111,503
METAL CHELATES AS INITIATORS FOR THE POLYMERIZATION OF FORMALDEHYDE
Timothy Edmond O'Connor, Brandywine Hundred, and Gelu Stoeff Stamatoff, Newark, Del., assignors to E. I. du Pont de Nemours and Company, Wilmington, Del., a corporation of Delaware
No Drawing. Filed Apr. 6, 1961, Ser. No. 101,065
5 Claims. (Cl. 260—67)

This invention relates to the polymerization of formaldehyde, and, more particularly, to a novel process for the polymerization of monomeric formaldehyde to a high molecular weight polymer using a metal chelate as the polymerization initiator.

This is a continuation-in-part application of copending application Serial Number 796,207, filed March 2, 1959, by T. E. O'Connor and G. S. Stamatoff, now abandoned.

Polymerization of monomeric formaldehyde to solid polymers is known in the art, and several processes have been developed using various initiators. This invention provides a process using a new and different class of initiators.

An object of this invention is to provide a new and useful process for the polymerization of monomeric formaldehyde to high molecular weight, normally solid polyoxymethylene. A further object of this invention is to provide a new class of initiators for the polymerization of formaldehyde to high molecular weight, normally solid polyoxymethylene. Other objects will appear hereinafter.

The above objects of this invention may be accomplished by contacting substantially anhydrous monomeric formaldehyde with a polymerization initiator which is a metal chelate of a Schiff's base, and recovering high molecular weight polyoxymethylene. The objects of this invention may also be accomplished by contacting substantially anhydrous monomeric formaldehyde with a polymerization initiator which is a metal chelate of a Schiff's base and in the presence of a mercapto compound of the structure:

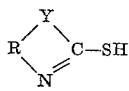

where R is a divalent hydrocarbon radical containing 2 to 12 carbon atoms and where Y is a divalent radical selected from the group consisting of >NH and >S.

In the preferred embodiment of this invention anhydrous formaldehyde having less than 0.5% by weight of water is polymerized by contact with a polymerization initiator which is a metal chelate of a Schiff's base. The metal is an element which has an atomic number from 22 to 30, and, therefore, includes titanium, vanadium, chromium, manganese, iron, cobalt, nickel, copper, and zinc. The Schiff's base is a condensation product of a phenolaldehyde such as salicylaldehyde, cresorcylaldehyde, hydroxytolualdehyde, and an unsubstituted amine having from 1 to 2 amino groups such as ethylenediamine, hexamethylenediamine, butylamine, octylamine, n-dodecylamine, cyclohexyldiamine and o-phenylenediamine. The polymerization process is normally accomplished by passing the anhydrous formaldehyde into a liquid hydrocarbon solvent such as heptane or cyclohexane, the solvent containing a metal chelate dissolved therein and also containing, if desirable, one of the mercapto compounds described above. While the formaldehyde is continuously introduced into this reaction medium, the reaction medium is agitated and maintained at a temperature of about −25° C. to 75° C. as particles of polymeric formaldehyde are formed, and finally recovering by filtration and other known means high molecular weight polyoxymethylene.

Where a mercapto compound is used in a mixture with the metal chelate, the preferred embodiment is to use a mercapto compound selected from the group consisting of 2-mercaptobenzimidazoline, 2-mercaptobenzthiazole, and 2-mercaptoimidazoline.

As used herein, inherent viscosities have been measured at 150° C. on solutions of 0.5 gram of polymer and 1 gram diphenylamine in 100 ml. of dimethylformamide. The formula for inherent viscosity is that reported by L. H. Cragg in Jour. of Colloid. Science 1, 261–9 (May 1946), and is expressed as follows:

$$\text{Inherent viscosity} = \frac{\ln \text{ relative viscosity}}{C}$$

where ln relative viscosity=the natural logarithm of the ratio of solution viscosity to solvent viscosity, and C=concentration of solute solution (grams of polymer/100 ml. solution). Inherent viscosities measured in p-chlorophenol have a value of approximately twice the value obtained by measurement in dimethylformamide, through the general range of inherent viscosities measured herein.

The term "high molecular weight," as used herein, shall mean an inherent viscosity of at least 0.50 in dimethylformamide. An inherent viscosity of 0.50 would correspond approximately to a number average molecular weight of 10,000 to 15,000. Unless otherwise noted, all parts and percentages used herein refer to parts and percentages by weight.

The following examples will serve to illustrate various aspects of this invention.

Example I

Monomeric formaldehyde was generated by pyrolyzing at 110° C. a slurry of commercial paraformaldehyde in cyclohexanol. The pyrolysis vapors were then passed through a series of 3 U-tubes maintained at 0° C., the first tube being empty and the remaining two tubes being filled with stainless steel packing. Formaldehyde vapors leaving these tubes were passed into a reaction medium of one liter of heptane which had previously been topped to remove about 10%. The heptane reaction medium contained as a polymerization initiator 0.05 gram of the copper chelate of a Schiff's base which is derived from salicylaldehyde and n-dodecylamine. The reaction medium was maintained at a temperature of 23° to 34° C. over a reaction period of 135 minutes, the monomeric formaldehyde being introduced into the reaction medium continuously over this period and particles of polyoxymethylene being formed continuously during this period. The polymeric particles were separated from the reaction medium by filtration and after being washed and dried were found to amount to a recovery of 33.7 grams. This polymer exhibited an inherent viscosity in dimethylformamide of 2.14 to 2.30.

Example II

Monomeric formaldehyde was generated by pyrolyzing cyclohexyl hemiformal at 110° C. The pyrolysis vapors were purified by passing them through a single flask cooled at room temperature and a series of 3 U-tubes maintained at 0° C., the first tube being empty and the remaining two tubes being filled with stainless steel packing. The formaldehyde vapors leaving the U-tubes were then passed into a reaction medium of 1 liter of topped heptane containing 0.304 of the copper chelate described in Example I and 0.15 gram of 2-mercaptobenzimidazole. The reaction medium was maintained at a temperature of 14° to 28° C. over a period of two hours. There was recovered 63 grams of polyoxymethylene exhibiting an inherent viscosity in dimethylformamide of 3.00 to 3.29. A portion of this polymer was pressed for one minute at 204° C. and 15,000 lbs. pressure to form a tough, translucent film. A weighed strip of this film was placed in a test tube filled with nitrogen and the test tube was then heated in a bath of decahydronaphthalene vapors (192° C.) for 30 minutes. The remainder of the film was weighed and the percentage weight loss was determined to be 14.6% over the one-half hour period.

*Example III*

Monomeric formaldehyde was generated by pyrolyzing at 110° C. a slurry of commercial paraformaldehyde in cyclohexanol. The pyrolysis vapors were purified by subjecting them to the flask and U-tubes described in Example II. The formaldehyde vapors were then passed into a reaction medium of one liter of topped heptane containing 0.32 gram of the copper chelate described in Example I and 0.07 gram of 2-mercaptoimidazoline. The reaction medium was maintained at 25° to 31° C. over a reaction period of 53 minutes. There was recovered 146 grams of polyoxymethylene exhibiting an inherent viscosity in dimethylformamide of 2.78 to 2.99. A portion of this polymer was subjected to the film weight loss test described in Example II and was found to lose 7.9% of its weight.

*Example IV*

Monomeric formaldehyde was prepared by pyrolyzing at 110° C. a slurry of commercial paraformaldehyde in cyclohexanol. The pyrolysis vapors were then passed through a series of two steam-jacketed condensers followed by one flask cooled at room temperature followed by 3 U-tubes cooled at 0° C., the first tube being empty and the remaining two tubes being filled with stainless steel packing. The formaldehyde vapors leaving these tubes were passed into a reaction medium of 1.3 liters of topped heptane containing 0.5 gram of copper chelate described in Example I and 0.2 gram of 2-mercaptobenzthiazole. The reaction medium was maintained at a temperature of 14° to 40° C. over a reaction period of 340 minutes. There was recovered 181 grams of polyoxymethylene having an inherent viscosity in dimethylformamide of 3.99.

*Example V*

Monomeric formaldehyde was generated and purified as described in Example II and was then passed into a reaction medium of one liter of topped heptane containing 0.15 gram of 2-mercaptobenzimidazole and 0.163 gram of the cobalt chelate of a Schiff's base which is derived from salicylaldehyde and ethylenediamine. The reaction medium was maintained at a temperature of 17° to 30° C. over a reaction period of two hours. There was recovered 74 grams of polyoxymethylene having an inherent viscosity in dimethylformamide of 3.20 to 3.63.

*Example VI*

Monomeric formaldehyde was generated and purified as in Example II and was then passed into a reaction medium of 1 liter of heptane containing .0165 gram of the metal chelate of copper stearate and an imidazoline of the structure:

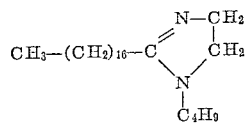

The reaction was maintained at 65 to 70° C. with a hold-up time of 5 minutes. There was recovered polyoxymethylene having an inherent viscosity of 1.21 in dimethylformamide.

Substantially the same results may be obtained by substituting for the metal chelate of the present example approximately equal molal amounts of any one of the following:

(1) The metal chelate of

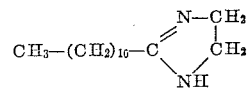

with zinc acetate.

(2) The metal chelate of

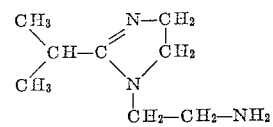

with cobalt benzoate.

(3) The metal chelate of

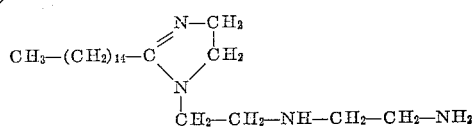

with copper abietate.

The foregoing examples have been submitted to illustrate certain preferred embodiments and are not to be construed as limitations of the invention. Substantially the same results are obtained using other metal chelates.

The critical feature of this invention is the chelate structure of the initiator. All metal chelates of Schiff's bases are operable in this invention. In general, metals with unshared valences in the inner shell are useful as chelating metals. It is preferred to use compounds which will form 5 to 6 membered chelate rings upon chelation. Chelates containing chelate rings of less than 5 members or more than 6 members are operable in this invention, but are more difficult to prepare.

Preparation of metal chelates is already well known in the art, such as, for example, the process disclosed in United States Letters Patent 2,665,265, issued to Arthur Regin Burgess on January 5, 1954. Metal chelates of Schiff's bases are generally prepared by reacting a Schiff's base with a metal, a metal oxide, or a metal salt in the presence of dilute alkali.

Among the operable chelates, it is preferred to employ a chelate of titanium, vanadium, chromium, manganese, iron, cobalt, nickel, copper and zinc. The ligand of the chelate is derived from a Schiff's base, which, in turn, is the condensation product of a phenolaldehyde, such as salicylaldehyde, and an unsubstituted amine or diamine, such as ethylene diamine, hexamethylenediamine, butylamine, octylamine, n-dodecylamine, cyclohexyldiamine and o-phenylenediamine.

The exact concentration of the initiator is not critical and can be varied over a wide range, although it may be said that in general one should use 1 mg. to 1000 mg. per liter of reaction medium and preferably from about 1 mg. to 400 mg. per liter of reaction medium.

Various mercapto compounds may be used advantageously in the process of this invention. If these compounds are employed, they are normally added to the reaction along with the metal chelate initiator described above. It is not known whether the mercapto compounds serve to initiate the polymerization, make the metal chelate more active, or to improve the polymer after it is formed. It, of course, is not necessary to the process of this invention that these mercapto compounds be employed, but it has been found, as shown by comparing Examples I and II herein, that by employing the mercapto compound, the polymer is formed quicker and has a higher inherent viscosity (and, thus, a higher molecular weight).

The amount of the mercapto compound which has been found useful in this process is from 0.1 to 5 moles, and preferably 0.5 to 1.5 moles, of mercapto compound per mole of metal chelate if any is employed.

While a reaction medium is not necessary to carry out this invention, it is generally desirable to use a reaction medium to provide better control of the process, better contact of the monomer and the initiator, and easier handling of the polymer product. The reaction medium may include a variety of compounds which are inert to the reactants and the product. Suitable reaction media include the aliphatic, cycloaliphatic, and aromatic hydrocarbons, hydrocarbon halides, ethers, etc. The preferred reaction media are hydrocarbons containing 3 to 10 carbon atoms such as propane, butane, pentane, hexane, heptane, octane, nonane, decane, cyclohexane, decahydronaphthalene, benzene, toluene, and xylene.

The temperature and pressure of the reaction are not critical. If the reaction is carried out in a reaction media, the process is generally limited to the range of temperatures at which the reaction medium is liquid, which range is about −110° C. to 100° C., the preferred range being −25° C. to 75° C. The preferred pressure is ambient atmospheric pressure although subatmospheric and superatmospheric pressures may be used if desired.

It is preferred to use substantially anhydrous monomer in this process. Preparation of monomeric formaldehyde is well known in the art. Desirable processes for the preparation of high purity monomeric formaldehyde are disclosed in United States Letters Patent 2,780,652, issued to Frederick William Gander on February 5, 1957; 2,824,051, issued to Richard Oliver Elder on February 18, 1958; 2,848,500 issued to Dennis Light Funck on August 19, 1958; and others known to those skilled in the art. Other useable procedures include the pyrolysis of paraformaldehyde, trioxane or other low molecular weight polymers of formaldehyde.

The process of this invention yields tough, high molecular weight polymers which may be converted to shaped articles such as films, filaments, fibers, rods, tubes, pipe, molded objects and other articles having a high degree of toughness and other desirable and useful properties.

We claim:

1. A process for preparing high molecular weight polyoxymethylene which comprises contacting, at a temperature of −110° C. to 100° C., substantially anhydrous monomeric formaldehyde with a catalytic amount of a polymerization initiator which is a metal chelate of a Schiff's base, said metal being an element having an atomic number from 22 to 30 and said Schiff's base being the condensation product of a phenolaldehyde and an amine containing 1 to 2 amino groups and being otherwise unsubstituted, and recovering high molecular weight polyoxymethylene.

2. The process of claim 1 in which the said metal is copper and the said Schiff's base is the condensation product of salicylaldehyde and an amine selected from the group consisting of ethylenediamine, n-dodecylamine, and o-phenylenediamine.

3. A process for preparing high molecular weight polyoxymethylene which comprises introducing substantially anhydrous monomeric formaldehyde into a reactor containing an agitated reaction medium which is a liquid hydrocarbon of 3 to 10 carbon atoms; said reaction medium having dissolved in each liter thereof 1 to 400 mg. of a polymerization initiator which is a metal chelate of a Schiff's base, said metal being an element having an atomic number from 22 to 30 and said Schiff's base being the condensation product of a phenoladlehyde and an amine containing 1 to 2 amino groups and being otherwise unsubstituted, said reaction medium also containing 0.1 to 5.0 mols per mol of said initiator of a mercapto compound of the structure

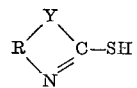

where R is a divalent hydrocarbon radical containing 2 to 12 carbon atoms and Y is a divalent radical selected from the group consisting of >S and >NH, maintaining the reaction medium at a temperature of −25° C. to 75° C. until the polymeric particles have formed, and recovering a dispersion of high molecular weight polyoxymethylene in said reaction medium.

4. The process of claim 3 in which said metal is copper and said Schiff's base is the condensation product of salicylaldehyde and an amine selected from the group consisting of ethylenediamine, n-dodecylamine, and o-phenylenediamine.

5. The process of claim 4 in which said mercapto compound is selected from the group consisting of 2-mercaptobenzimidazole, 2-mercaptobenzthiazole, and 2-mercaptoimidazoline.

References Cited in the file of this patent
UNITED STATES PATENTS
2,848,437    Langsdorf et al. _____ Aug. 19, 1958